(12) United States Patent
Lee et al.

(10) Patent No.: US 8,691,410 B2
(45) Date of Patent: Apr. 8, 2014

(54) BATTERY PACK

(75) Inventors: Wonil Lee, Yongin-si (KR); Daeyon Moon, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/564,108

(22) Filed: Aug. 1, 2012

(65) Prior Publication Data

US 2013/0108900 A1     May 2, 2013

Related U.S. Application Data (60) Provisional application No. 61/554,933, filed on Nov. 2, 2011.

(51) Int. Cl.
*H01M 10/50* (2006.01)
*H01M 2/34* (2006.01)

(52) U.S. Cl.
USPC .......................................................... 429/62

(58) Field of Classification Search
USPC ........ 429/7, 62, 121, 161, 162, 163, 173, 174
See application file for complete search history.

(56) References Cited

U.S. PATENT DOCUMENTS

| | | | |
|---|---|---|---|
| 6,432,575 B1 * | 8/2002 | Yamagami | 429/100 |
| 2007/0202396 A1 * | 8/2007 | Jung | 429/174 |
| 2008/0118820 A1 * | 5/2008 | Jang et al. | 429/62 |
| 2009/0081538 A1 | 3/2009 | Moon | |
| 2009/0092860 A1 * | 4/2009 | Yamamoto et al. | 429/7 |
| 2009/0110964 A1 * | 4/2009 | Dobata et al. | 429/7 |
| 2010/0143793 A1 * | 6/2010 | Yamamoto | 429/175 |
| 2011/0097608 A1 | 4/2011 | Park et al. | |

FOREIGN PATENT DOCUMENTS

| | | |
|---|---|---|
| JP | 2009 110708 | 5/2009 |
| KR | 2009 0030710 | 3/2009 |
| KR | 2011 0045630 | 5/2011 |

* cited by examiner

*Primary Examiner* — Milton I Cano
*Assistant Examiner* — Lilia V Nedialkova
(74) *Attorney, Agent, or Firm* — Knobbe, Martens, Olson & Bear, LLP

(57) ABSTRACT

A battery pack is disclosed which can inhibit unwanted electric short-circuits between a secondary battery and a thermal safety device. The battery pack may be further configured such that the number of welding points is reduced, simplifying a manufacturing process for the battery pack. The battery pack may include a secondary battery including a case having a first polarity, a terminal protruding from the case having a second polarity opposite to the first polarity, a safety member including an insulating holder mounted in the case around the terminal, a thermal safety device, and a conductive plate. The thermal safety device may be mounted in the insulating holder and electrically connected to the terminal. The conductive plate may be electrically connected to the thermal safety device and mounted in the insulating holder around the thermal safety device.

18 Claims, 10 Drawing Sheets

BATTERY PACK

CROSS-REFERENCE TO RELATED APPLICATIONS

This application claims the benefit of priority of U.S. Provisional Patent Application No. 61/554,933, entitled "BATTERY PACK", and filed on Nov. 2, 2011, the entirety of which is hereby incorporated by reference.

BACKGROUND OF THE INVENTION

1. Field of the Invention

Embodiments of the present invention relate to a battery pack.

2. Description of the Related Art

In general, primary batteries are batteries designed to be used once and discarded. Unlike the primary battery, the secondary battery may be recharged and may be used as the power source for various advanced electronic devices such as cellular phones, smart phones, notebook computers, camcorders, hybrid vehicles, electric vehicles, electric scooters and the like. In particular, lithium ion batteries are widely applied to the portable appliances because: (i) they have an operating voltage of 3.6 volts, which is about three times higher than a nickel-cadmium battery or a nickel-hydrogen battery, which are often used to power electronic equipment, and (ii) they possess high energy density per unit weight.

Since the lithium in a lithium ion secondary batteries generally exists in an ion state when the battery is used, lithium ion batteries are remarkably stable compared to metal lithium secondary batteries. However, since major components of lithium ion batteries (e.g., a negative electrode, electrolyte, etc.) are flammable, lithium ion batteries employ a highly sophisticated safety member to increase the battery stability, as compared to aqueous batteries. For example, lithium ion batteries may have a positive temperature coefficient (PTC) device mounted thereon, which is generally called a battery pack or a single pack.

When the temperature of a lithium ion battery having a PTC device mounted thereon exceeds a predetermined level, the PTC device has limitless electrical resistance. As a result. If the secondary battery reaches a high temperature state, the PTC device breaks the flow of charge/discharge current in order to allow the battery to cool. When the batter temperature decreases, the PTC device reversibly operates and the PTC device resistance is reduced, so that the battery may function properly.

However, when the PTC device is assembled with the secondary battery, an unwanted electric short-circuit between the secondary battery and the PTC device is likely to occur. For example, during assembling, a PTC device having negative polarity may be electrically shorted to a battery case having positive polarity. Thus, in order to prevent an unwanted electric short-circuit, many of additional components and process steps, including placing an insulating sheet between the secondary battery and the PTC device, have conventionally been employed, which is problematic.

SUMMARY

Embodiments of the present disclosure provide a battery pack which can prevent an unwanted electric short-circuit between a secondary battery and a PTC device.

Embodiments of the present disclosure further provide a battery pack which can reduce the number of welding points and can simplify a manufacturing process.

Embodiments of the present disclosure provide a battery pack including a secondary battery including a case having a first polarity and a terminal protruding from the case with a second polarity opposite to the first polarity, a safety member including an insulating holder mounted in the case around the terminal, a PTC device mounted in the insulating holder and electrically connected to the terminal, and a conductive plate electrically connected to the PTC device and mounted in the insulating holder around the PTC device.

In the safety member, the insulating holder includes a frame which is shaped of a rectangular ring and has a thickness, a first planar portion which has a thickness smaller than that of the frame inside the frame, and has a first opening through which the terminal passes, and on which the conductive plate is mounted. The insulating holder may further include a second planar portion which has a thickness smaller than that of the first planar portion and has a second opening spaced apart from the first opening, through which the PTC device passes, and on which the PTC device is mounted. The insulating holder may additionally include a support which is formed between the first and second openings and on which the thermal safety device is mounted.

In an embodiment, first guide members guiding the conductive plate may be formed in at least two corners of the first planar portion.

In an embodiment, second guide members guiding the conductive plate may be formed in at least two corners of the second planar portion.

In an embodiment, The conductive plate may include openings corresponding to the first and second openings, a first region mounted on the first planar portion, and a second region extending from the first region to the opening.

In an embodiment, the second region may be electrically connected to the PTC device.

In an embodiment, first coupling regions coupled to the first guide members may be formed in at least two corners of the first region.

In an embodiment, the second region may be coupled to the second guide members.

In an embodiment, the insulating holder and the conductive plate may be adhered to each other using an adhesion member.

In an embodiment, the insulating holder and the conductive plate may be formed by insert injection molding.

As described above, in a battery pack according to one embodiment of the present invention, there is provided a separate safety member including an insulating holder, a PTC device and a conductive plate, where the safety member is electrically connected to a secondary battery, thereby preventing an unwanted electrical short-circuit between the secondary battery and the PTC device.

A battery pack according to one embodiment of the present invention may be manufactured by a method including a first welding operation of welding a connection plate and a conductive plate to a PTC device, and a second welding operation of welding the connection plate and a secondary battery. Thus, the number of welding points in embodiments of the disclosed battery pack may be reduced, as compared to a conventional battery pack. In addition, a safety member including a PTC device may be formed in advance and assembled to the secondary battery, thereby simplifying a manufacturing process.

In a further embodiment, a battery pack is provided. The battery pack may comprise a secondary battery having a case and a first terminal and a safety member in electrical communication with the secondary battery. The safety member may comprise an insulating holder, a thermal safety device, and a conductive plate. The thermal safety device may comprise a body and first and second lead plates extending from the body. The thermal safety device may be mounted within the insulating holder so that the insulating holder is interposed between the thermal safety device and the secondary battery case and so that the thermal safety device is in electrical communication with the first terminal via the first lead plate. The conductive plate may be mounted to the insulating holder and in electrical communication with the thermal safety device via the second lead plate.

In an embodiment, a frame of insulating holder may comprise a first planar portion, a first opening configured to receive the first terminal, a second planar portion, and a second opening spaced apart from the first opening and configured to receive a body of the thermal safety device. The first terminal may be positioned within the first opening when the insulating holder is mounted to the secondary battery.

In an embodiment, the body of the thermal safety device may be positioned within the second opening and the first and second lead plates may be supported by the insulating holder adjacent to the second opening when the thermal safety device is mounted within the insulating holder.

In an embodiment, the conductive plate may be mounted to the insulating holder at about the first planar portion of the insulating holder.

In an embodiment, a thickness of the first planar portion of the insulating holder may be less than that of the frame of the insulating holder.

In an embodiment, a thickness of the second planar portion of the insulating holder may be less than the thickness of the first planar portion of the insulating holder.

In an embodiment, the insulating holder may further comprise first guide members formed in at least one corner of the first planar portion of the insulating holder configured to guide the conductive plate into a selected position with respect to the insulating holder when the conductive plate is mounted to the insulating holder.

In an embodiment, the insulating holder may further comprise second guide members formed in at least one corner of the second planar portion of the insulating holder configured to guide the conductive plate into a selected position with respect to the insulating holder when the conductive plate is mounted to the insulating holder.

In an embodiment, the conductive plate may further comprise a first region having an opening and a second region. The thermal safety device may be disposed within the opening and be electrically coupled to the second region.

In an embodiment, the opening may be sized to correspond to the first opening, the second planar portion, the second opening of the insulating holder and the portion of the insulating holder positioned between the first and second openings of the insulating holder.

In an embodiment, the conductive plate may comprise a coupling region. The coupling region may be coupled to the first guide members of the insulating holder when the conductive plate is mounted to the insulating holder.

In an embodiment, the second region may be coupled between the second guide members of the insulating holder when the conductive plate is mounted to the insulating holder. The second region may be in electrical communication with the second lead plate of the thermal safety device when the conductive plate is mounted to the insulating holder.

In an embodiment, the second region of the conductive plate may further comprise a first bent portion that is downwardly bent from the first region of the conductive plate and a second bent portion extending from the first bent portion that extends substantially horizontally from the first bent portion. The conductive plate may be in electrical communication with the second lead plate of the thermal safety device at about the second bent portion.

In an embodiment, the battery pack may further comprise an adhesion member interposed between at least a portion of the insulating holder and the conductive plate for mechanically securing the insulating holder to the conductive plate.

In an embodiment, the battery pack may further comprise a first tape. The first tape may be adhered to the insulating holder and the battery case. The first tape may cover the opening of the conductive plate. A selected portion of the conductive plate may not covered by the first tape.

In an embodiment, the battery pack may further comprise a second tape. The second tape may be adhered to at least a portion of the first tape, at least a portion of the safety holder, and at least a first portion of the battery case. A second portion of the battery case may not be covered by the second tape.

In an embodiment, the battery pack may further comprise a second terminal that is positioned on a face of the battery opposing the first terminal.

In an embodiment, the insulating holder and the conductive plate may be formed by insert injection molding.

DETAILED DESCRIPTION

Reference will now be made in detail to the embodiments of the present disclosure, non-limiting examples of which are illustrated in the accompanying drawings such that they can easily be made and used by those skilled in the art.

Figure 1A:
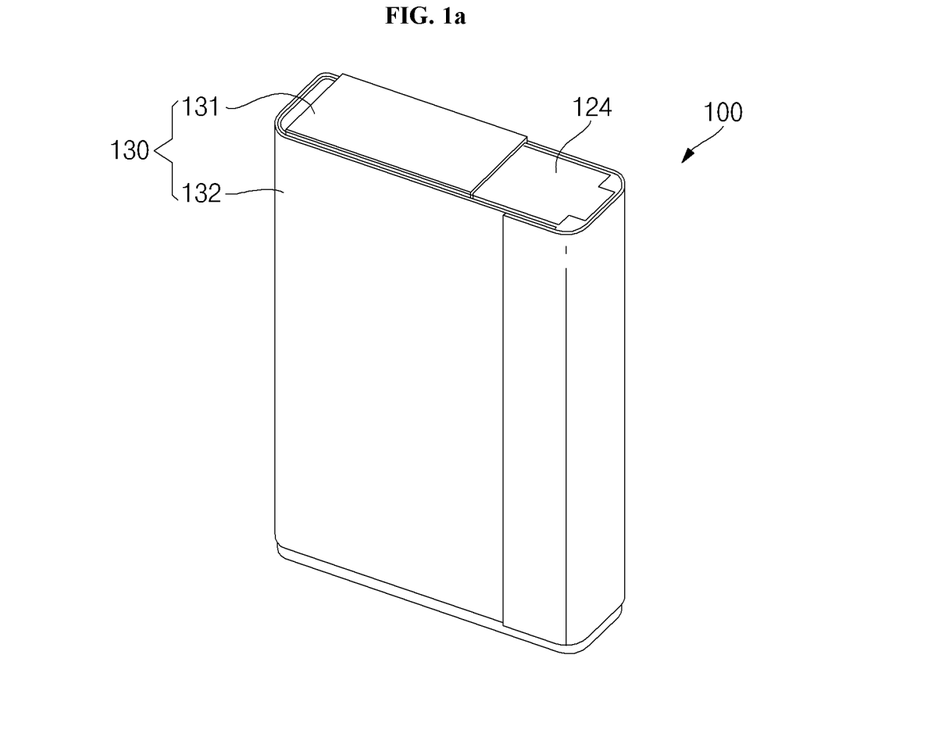
FIGS. 1a, 1b, and 1c are schematic views of a battery pack according to an embodiment of the present disclosure; (a) perspective view; (b) exploded perspective view; (c) cross-section view.
Figure 1B:
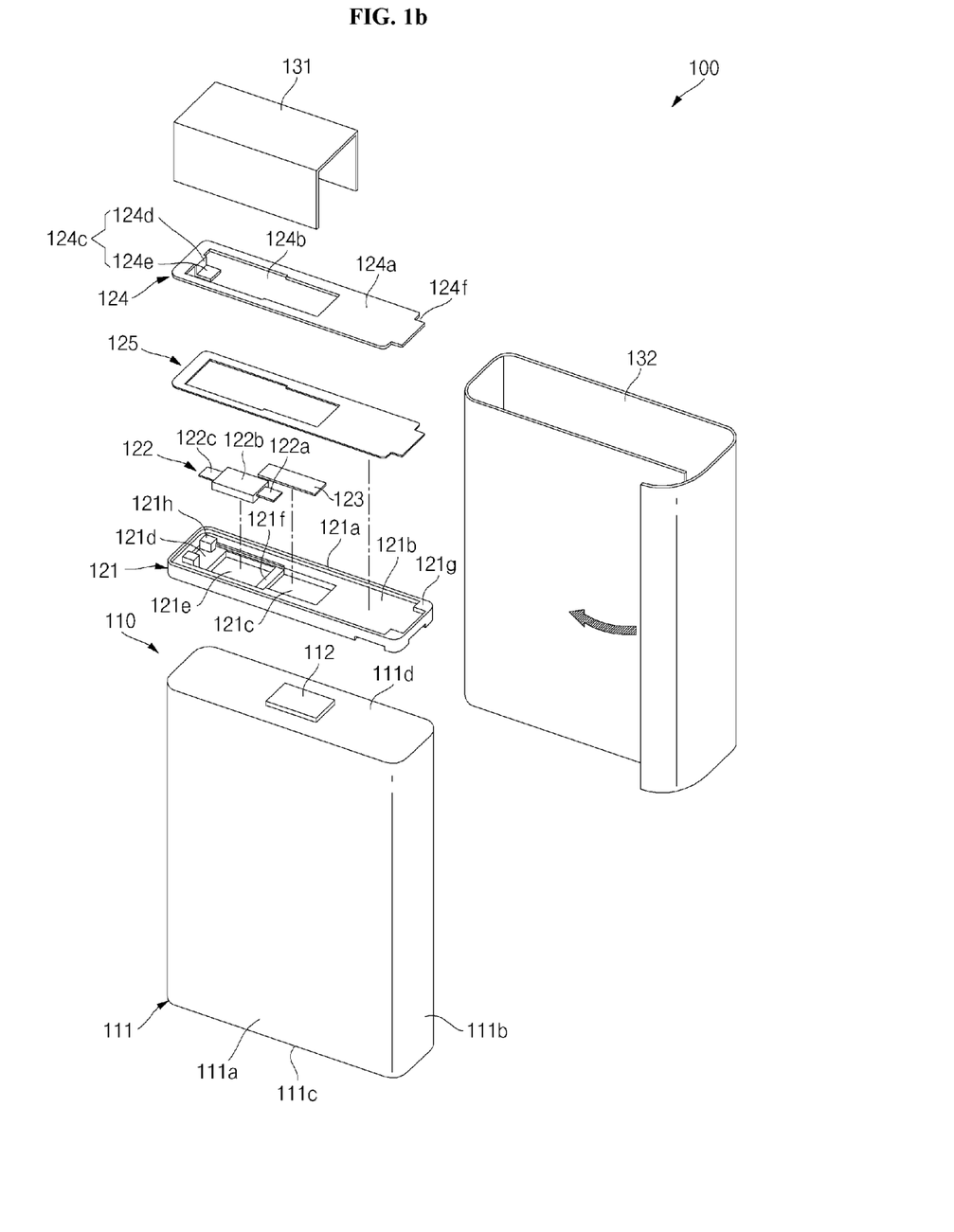
Figure 1C:
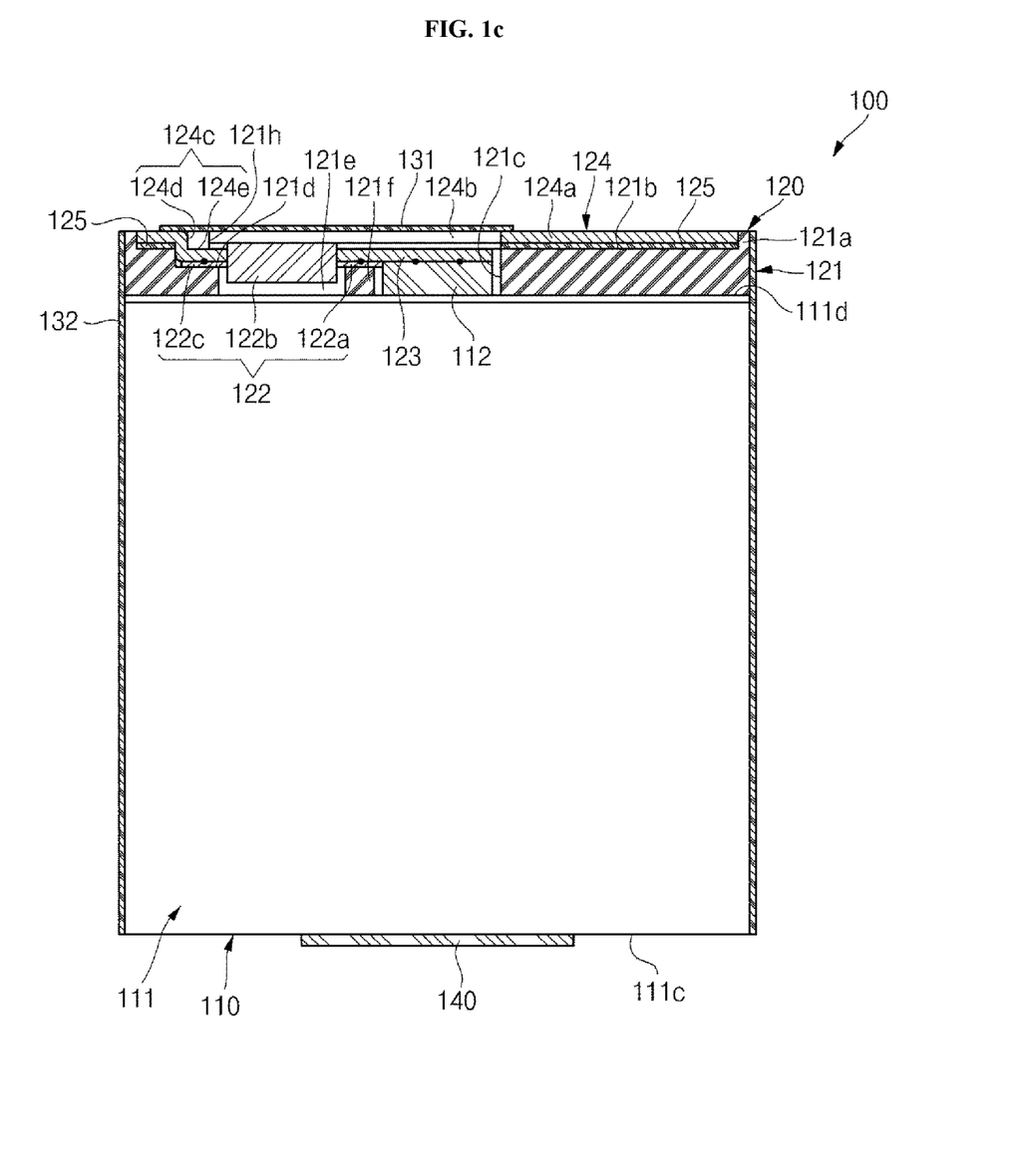

FIGS. 1a, 1b, and 1c are schematic views of an embodiment of battery pack of the present disclosure. FIG. 1a is a perspective view, FIG. 1b is an exploded perspective view, and FIG. 1c is a cross-sectional view. As shown in FIGS. 1a, 1b and 1c, the battery pack 100 according to an embodiment of the present invention includes a secondary battery 110, a safety member 120, and a tape 130.

The secondary battery 110 includes a case 111 and a terminal 112. In more detail, the case 111 includes two long side areas 111a spaced apart from each other, two short side areas 111*b* formed between the two long side areas 111*a* and spaced apart from each other, a bottom area 111*c* formed between the two long side areas 111*a* and the two short side areas 111*b*, and a cap plate 111*d* formed between the two long side areas 111*a* and the two short side areas 111*b* and spaced apart from the bottom area 111*c*. In certain embodiments, the cap plate 111*d* may be welded to the two long side areas 111*a* and the two short side areas 111*b*.

In addition, the terminal 112 may be formed to pass through the cap plate 111*d* and may be electrically insulated from the cap plate 111*d*. Although not shown, an electrode assembly and electrolyte may be accommodated in the case 111. The electrode assembly may include a first electrode plate (e.g., a positive electrode plate or a negative electrode plate) electrically connected to the case 111, a second electrode plate of opposing polarity to the first electrode plate (e.g., a negative electrode plate or a positive electrode plate) electrically connected to the terminal 112, and a separator disposed between the first electrode plate and the second electrode plate. Thus, for example, the case 111 have a first polarity (a positive or negative polarity) and the terminal 112 may have a second polarity (a negative or positive polarity). In alternative embodiments, the polarities of the case 111 and the terminal 112 may be reversed.

The safety member 120 may include an insulating holder 121, a PTC device 122, a connection plate 123, a conductive plate 124 and an adhesion member 125.

The insulating holder 121 may include a frame 121*a*, a first planar portion 121*b* having a first opening 121*c*, a second planar portion 121*d* having a second opening 121*e*, a support 121*f*, a first guide member 121*g*, and a second guide member 121*h*. In addition, the insulating holder 121 may be formed of thermosetting plastic. Examples of materials from which the insulating holder 121 may be formed may include, but are not limited to, polyvinyl chloride, polyethylene, polystyrene, polypropylene, acryl, or nylon, or thermo-curable plastic such as phenol, melanin, or epoxy.

The frame 121*a* may include a substantially rectangular ring having a predetermined thickness. The frame 121*a* may be shaped similar to the circumference of the cap plate 111*d*. That is to say, since the frame 121*a* is mounted on the cap plate 111*d*, it may be configured with a shape similar to the circumference of the cap plate 111*d*.

The first planar portion 121*b* may be formed inside the frame 121*a* and possess a thickness smaller than that of the frame 121*a*. In addition, a first opening 121*c* may be formed at a region corresponding to the terminal 112. In an embodiment, the terminal 112 may be coupled to the first opening 121*c*.

The second planar portion 121*d* may be formed inside the first planar portion 121*b* and possess a thickness smaller than that of the first planar portion 121*b*. In addition, a second opening 121*e* may be formed at a region of the second planar portion 121*d* that is spaced apart from the first opening 121*c*. Here, a thermal safety device 122 to be described later is positioned in the second opening 121*e*. In an embodiment, the thermal safety device 122 may comprise a positive temperature coefficient (PTC) device.

The support 121*f* may be formed between the first opening 121*c* and the second opening 121*e*. The connection plate 123 and a first lead plate 122*a* of the thermal safety device 122, which will later be described, may be mounted in the support 121*f*. The support 121*f* may support the connection plate 123 and the first lead plate 122*a* of the thermal safety device 122 from below and prevent the connection plate 123 and the first lead plate 122*a* of the thermal safety device 122 from being electrically shorted to the cap plate 111*d*.

The first guide members 121*g* may be formed at two corners corresponding to the first planar portion 121*b*. The first guide members 121*g* may protrude a predetermined length inwardly from the two corners of the frame 121*a*. The first guide members 121*g* may guide the conductive plate 124, as discussed in greater detail below. That is to say, in an embodiment, a first coupling region 124*f* formed in the conductive plate 124 may be coupled to the first guide members 121*g*.

The second guide members 121*h* may be formed at two corners corresponding to the second planar portion 121*d*. The second guide members 121*h* may protrude a predetermined length inwardly and upwardly with respect to the first planar portion 121*b* from the first planar portion 121*b*. The second guide members 121*h* guide a second region 124*c* of the conductive plate 124, as discussed in greater detail below. That is to say, in an embodiment, the second region 124*c* formed in the conductive plate 124 may be coupled between the second guide members 121*h*.

The thermal safety device 122 may include a first lead plate 122*a*, a device or body portion 122*b* and a second lead plate 122*c*. The first lead plate 122*a* may possess a first end welded to the connection plate 123 and a second end connected to the device portion 122*b*. The resistance of the device portion 122*b* increases proportionally to an increase in temperature. The first lead plate 122*a* may be connected to one side of the device portion 122*b*, and the second lead plate 122*c* may be connected to the other side of the device portion 122*b*. One end of the second lead plate 122*c* may be connected to the device portion 122*b*, and the other end of the second lead plate 122*c* may be welded to the second region 124*c* of the conductive plate 124. In an embodiment, the first lead plate 122*a* and the second lead plate 122*c* may be formed from materials including, but not limited to, at least one of nickel, a nickel alloy, and equivalents thereof.

In further embodiments, the first lead plate 122*a* may be substantially mounted in the support 121*f* of the insulating holder 121, the device portion 122*b* may be coupled substantially to the second opening 121*e* of the insulating holder 121, and the second lead plate 122*c* may be mounted substantially in the second planar portion 121*d* of the insulating holder 121. Therefore, the first lead plate 122*a* and the second lead plate 122*c* are not electrically shorted to the cap plate 111*d*. In other words, in the thermal safety device 122 according to the disclosed embodiments, the first lead plate 122*a* may be electrically connected to the terminal 112 through the connection plate 123 but occurrence of an electric short-circuit between the first lead plate 122*a* and the cap plate 111*d*, or between the second lead plate 122*c* and the cap plate 111*d* may be substantially inhibited or prevented.

The connection plate 123 may include one end welded to the first lead plate 122*a* and the other end welded to the terminal 112. Thus, the connection plate 123 may electrically connect the terminal 112 and the thermal safety device 122. In addition, the connection plate 123 may be formed from materials including, but not limited to, at least one of nickel, a nickel alloy, and equivalents thereof.

The conductive plate 124 may include a first region 124*a* having an opening 124*b* and a coupling region 124*f*, and a second region 124*c*. The conductive plate 124 may be generally formed materials including, but not limited to, nickel coated stainless steel and equivalents thereof. The first region 124*a* may be formed to correspond to the first planar portion 121*b* of the insulating holder 121 and may be coupled to the first planar portion 121*b*. In an embodiment, the opening 124*b*, which may be sized to correspond to the first opening 121*c*, the second planar portion 121*d*, the second opening 121e and the support 121f of the insulating holder 121, may be formed in the conductive plate 124.

In further embodiments, the coupling region 124f coupled to the first guide members 121g of the insulating holder 121 may be also formed in the conductive plate 124. The coupling region 124f may be formed by cutting two opposing corners of the conductive plate 124. The second region 124c may be extended a predetermined length and bent toward the opening 124b from the first region 124a. That is to say, the second region 124c may include a first bent portion 124d downwardly bent from the first region 124a, and a second bent portion 124e horizontally bent from the first bent portion 124d. The second lead plate 122c of the thermal safety device 122 may be welded to the second bent portion 124e. In addition, the second region 124c may be coupled between the second guide members 121h formed in the second planar portion 121d.

As described above, the coupling region 124f of the conductive plate 124 may be coupled to the first guide members 121g of the insulating holder 121, and the second region 124c of the conductive plate 124 may be coupled to the second guide members 121h of the insulating holder 121. In this manner, the conductive plate 124 may be inhibited from horizontally moving from the insulating holder 121.

The adhesion member 125 may be disposed between the insulating holder 121 and the conductive plate 124. The adhesion member 125 may be selected from adhesive structures including, but not limited to, a double sided adhesive tape, an epoxy adhesive, and equivalents thereof. The adhesion member 125 may inhibit the insulating holder 121 and the conductive plate 124 from being separated from each other. In other words, the safety member 120, including the insulating holder 121, the thermal safety device 122, the connection plate 123 and the conductive plate 124, may be regarded as one independent component by the adhesion member 125. Therefore, a manufacturing process of the safety member 120 to the secondary battery 110 may be easily performed.

The tape 130 may include a first tape 131 and a second tape 132. The first and second tapes 131 and 132 may be formed from materials including, but not limited to, polyethylene terephthalate and equivalents thereof. The first tape 131 may be adhered to the insulating holder 121 and the case 111 of the secondary battery 110 while closing the opening 124b of the safety member 120. That is to say, the first tape 131 may be positioned in order to cover the lateral surfaces of the insulating holder 121 and the long side areas 111a of the case 111 while also covering the opening 124b of the conductive plate 124. Therefore, the safety member 120 may be adhered to the case 111 of the secondary battery 110 in a more secured manner. That is to say, the connection plate 123 of the safety member 120 may be welded to the terminal 112 of the secondary battery 110, and the conductive plate 124 may be mechanically coupled to the to the case 111 of the secondary battery 110 by the first tape 131, thereby inhibiting the safety member 120 from being easily separated from the secondary battery 110.

In addition, the second tape 132 may substantially wrap the first tape 131, the safety member 120 and the secondary battery 110. In other words, the second tape 132 may wind the long side areas 111a and the short side areas 111b of the case 111 of the secondary battery 110 at least once while also wrapping side portions of the first tape 131 and side portions of the frame 121a of the insulating holder 121 in the safety member 120. In such a manner, a predetermined region of the conductive plate 124 in the safety member 120, excluding a region covered by the first tape 131, may be directly exposed to the outside, and the bottom area 111c of the case 111 of the secondary battery 110 may also be directly exposed to the outside.

In an embodiment, a nickel plate 140 may further be coupled to the bottom area 111c of the case 111. An external device may further be connected to the nickel plate 140. In addition, the external device may further be connected to the predetermined region of the conductive plate 124 exposed to the outside through the first and second tapes 131 and 132.

Figure 2A:
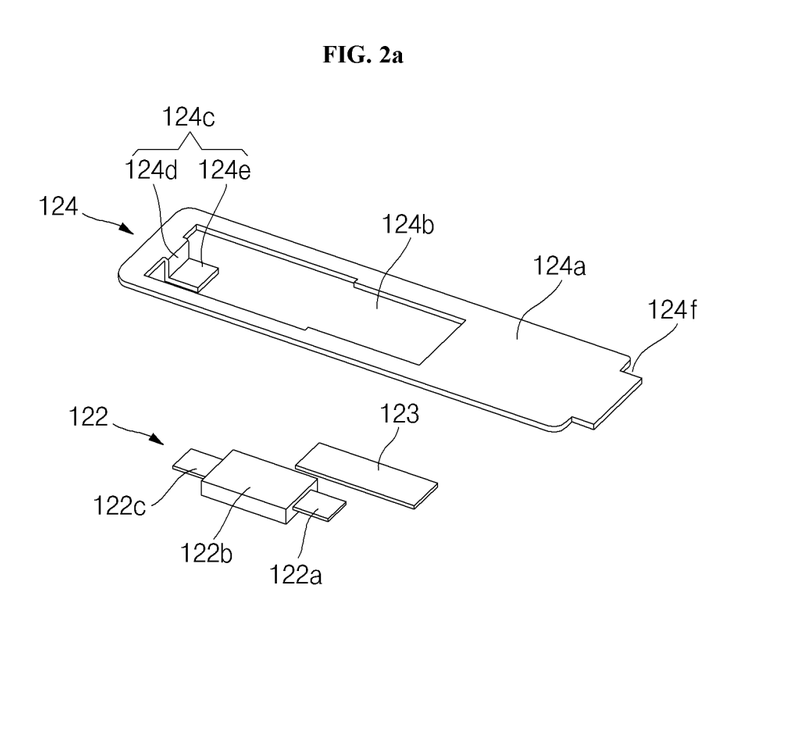
FIGS. 2a and 2b are schematic, perspective views illustrating a method of manufacturing a battery pack according to an embodiment of the present disclosure in which a PTC device and a conductive plate are welded to each other.
Figure 2B:
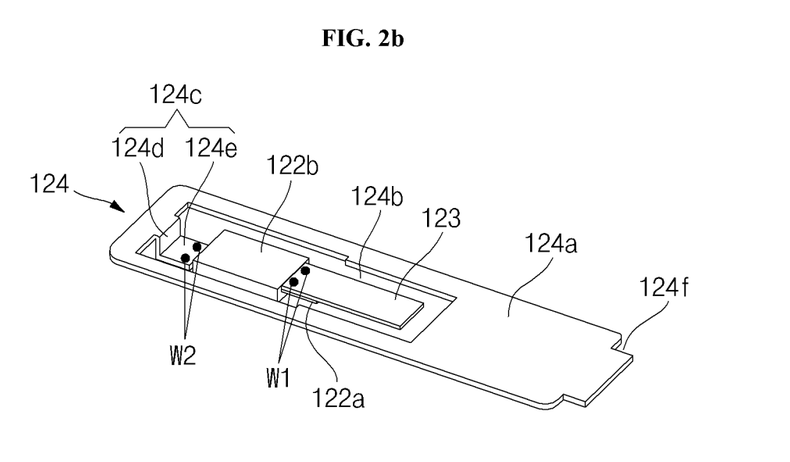

FIGS. 2a and 2b are perspective views illustrating a state in which a thermal safety device and a conductive plate are welded to each other in a method of manufacturing a battery pack according to an embodiment of the present invention.

As shown in FIGS. 2a and 2b, the first lead plate 122a of the thermal safety device 122 may be welded to the connection plate 123 and the second lead plate 122c of the thermal safety device 122 may be welded to the second region 124c of the conductive plate 124. Undefined reference symbol W1 is a first welding region between the first lead plate 122a and the connection plate 123, and undefined reference symbol W2 is a second welding region between the second lead plate 122c and the second region 124c. In this way, the thermal safety device 122, the connection plate 123 and the conductive plate 124 may be incorporated into a single component by performing welding twice.

Figure 3A:
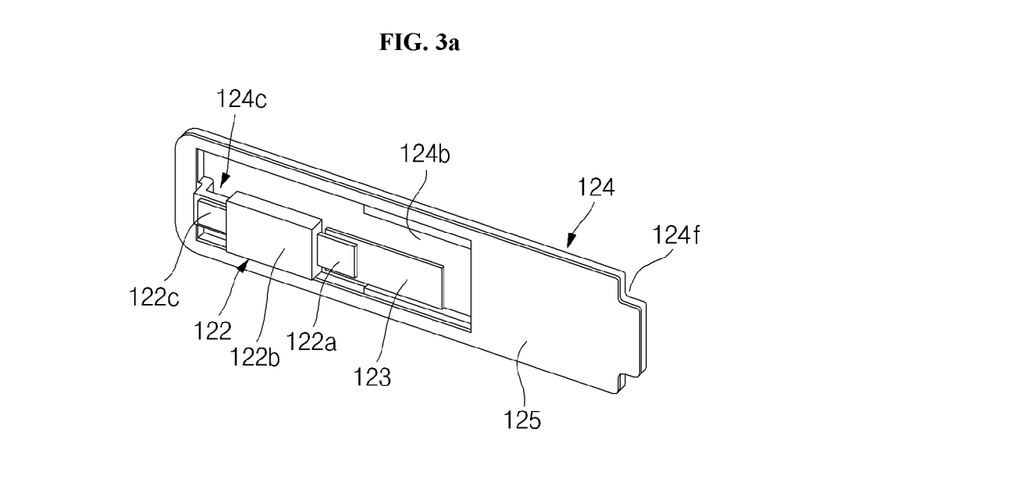
FIGS. 3a and 3b are schematic, perspective views illustrating a method of manufacturing a battery pack according to an embodiment of the present disclosure in which an insulating holder and a conductive plate are adhered to each other disclosure.
Figure 3B:
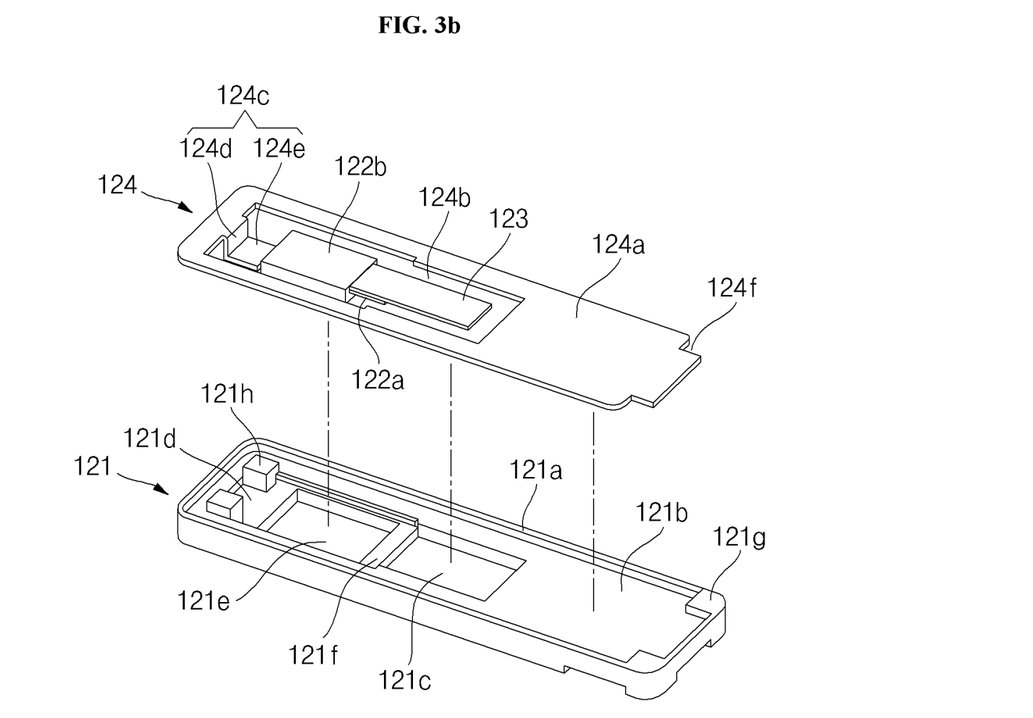

FIGS. 3a and 3b are perspective views illustrating a state in which an insulating holder and a conductive plate are adhered to each other in a method of manufacturing a battery pack according to an embodiment of the present invention.

As shown in FIGS. 3a and 3b, the conductive plate 124 having the thermal safety device 122 connected thereto may be adhered to the first planar portion 121b of the insulating holder 121 through the adhesion member 125. The adhesion member 125 may be selected from adhesion structures including, but not limited to, any one double sided adhesive tape, epoxy adhesives, and equivalents thereof. In this way, the safety member 120 including the insulating holder 121, the thermal safety device 122, the connection plate 123 and the conductive plate 124 may be treated as an independent component by use of the adhesion member 125.

In an embodiment, the connection plate 123 may be located approximately in the first opening 121c of the insulating holder 121, and the thermal safety device 122 may be substantially coupled to the second opening 121e of the insulating holder 121.

Figure 4A:
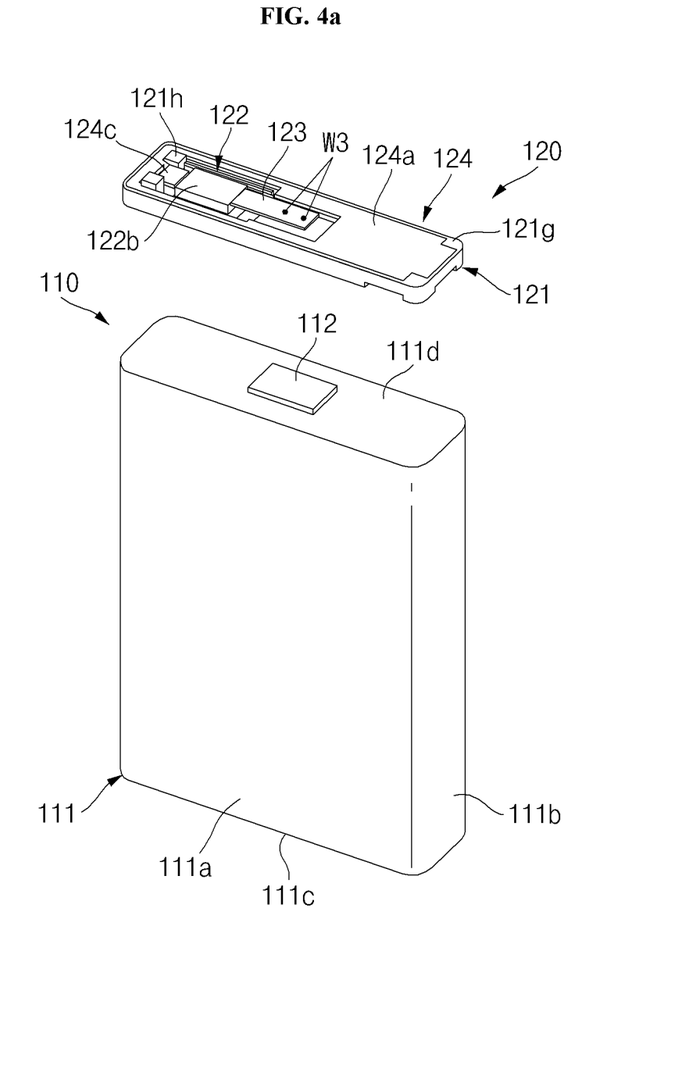
FIGS. 4a and 4b are schematic, perspective views illustrating a method of manufacturing a battery pack according to an embodiment of the present disclosure in which a secondary battery and a safety member are welded to each.
Figure 4B:
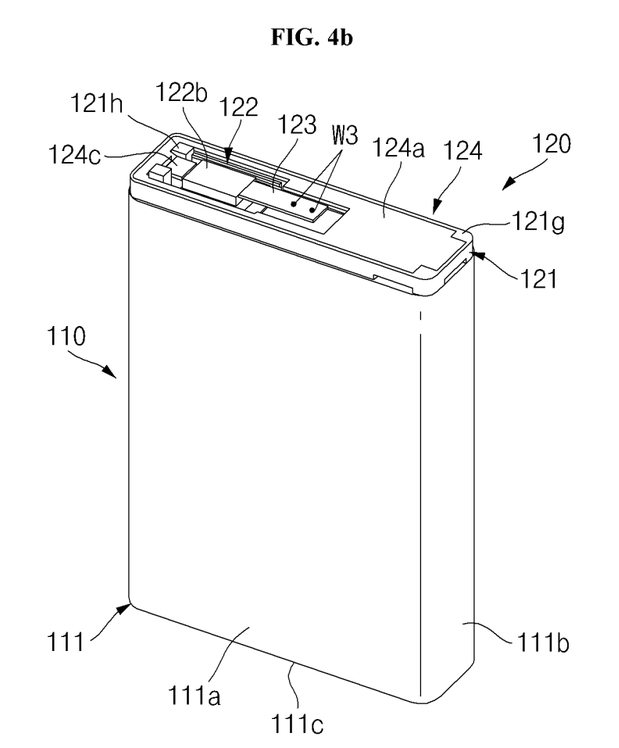

FIGS. 4a and 4b are perspective views illustrating a state in which a secondary battery and a safety member are welded to each other in a method of manufacturing a battery pack according to an embodiment of the present invention.

As shown in FIGS. 4a and 4b, the safety member 120 may be electrically connected to the secondary battery 110. That is to say, the connection plate 123 of the safety member 120 may be welded to the terminal 112 of the secondary battery 110. Therefore, in the present invention, welding may be performed three times in total.

As described above, the thermal safety device 122 may be electrically connected to the terminal 112. In addition, the conductive plate 124 may be electrically insulated from the case 111 and the cap plate 111d of the secondary battery 110 and may be securely mounted on the cap plate 111d.

Undefined reference symbol W3 is a third welding region between the connection plate 123 and the terminal 112.

Figure 5A:
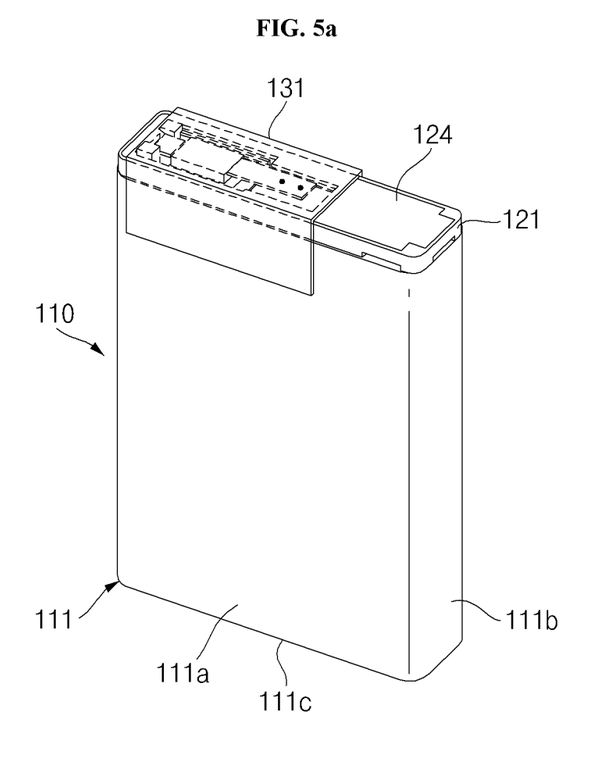
FIGS. 5a and 5b are schematic, perspective views illustrating a taping state of a method for manufacturing a battery pack according to an embodiment of the present disclosure in which a battery pack is taped using a tape.
Figure 5B:
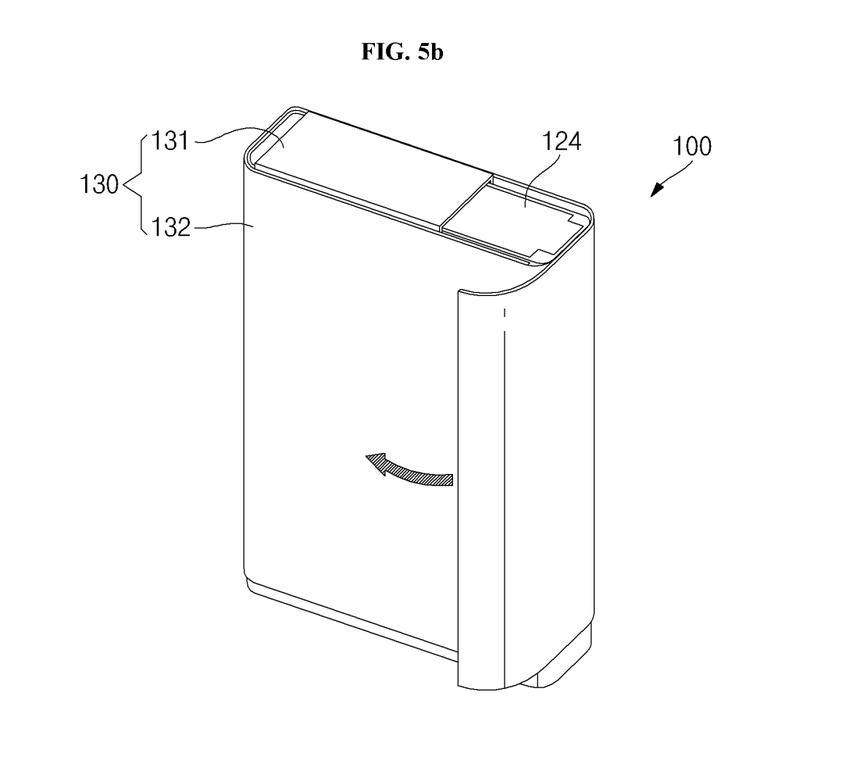

FIGS. 5a and 5b are perspective views illustrating a taping state in which a battery pack is taped using a tape in a method for manufacturing a battery pack according to an embodiment of the present invention.

As shown in the embodiment of FIG. 5a, since the first tape 131 is coupled to the safety member 120 and the secondary battery 110, it is possible to prevent the safety member 120 from being released from the secondary battery 110. In addition, the first tape 131 may cover the opening 124b of conductive plate 124 of the safety member 120, thereby inhibiting foreign materials from infiltrating into the opening 124b. Here, a predetermined region of the conductive plate 124 may be exposed to the outside of the first tape 131. Thus, an external device may be electrically connected to the predetermined region of the exposed conductive plate 124.

As shown in FIG. 5b, the second tape 132 may wrap the secondary battery 110, thereby inhibiting an unwanted electric short-circuit between the secondary battery 110 and the external device. That is to say, the second tape 132 may wrap the case 111 of the secondary battery 110, specifically the long side areas 111a and the short side areas 111b of the case 111. In addition, the second tape 132 may wrap the safety member 120, specifically side portions of the insulating holder 121, thereby allowing the safety member 120 to be adhered to the secondary battery 110 in a more secured manner. Further, the bottom area 111c of the case 111 may be exposed to the outside through the second tape 132. In addition, since the nickel plate 140 is formed in the bottom area 111c of the case 111, an external device may be electrically connected to the nickel plate 140.

Figure 6A:
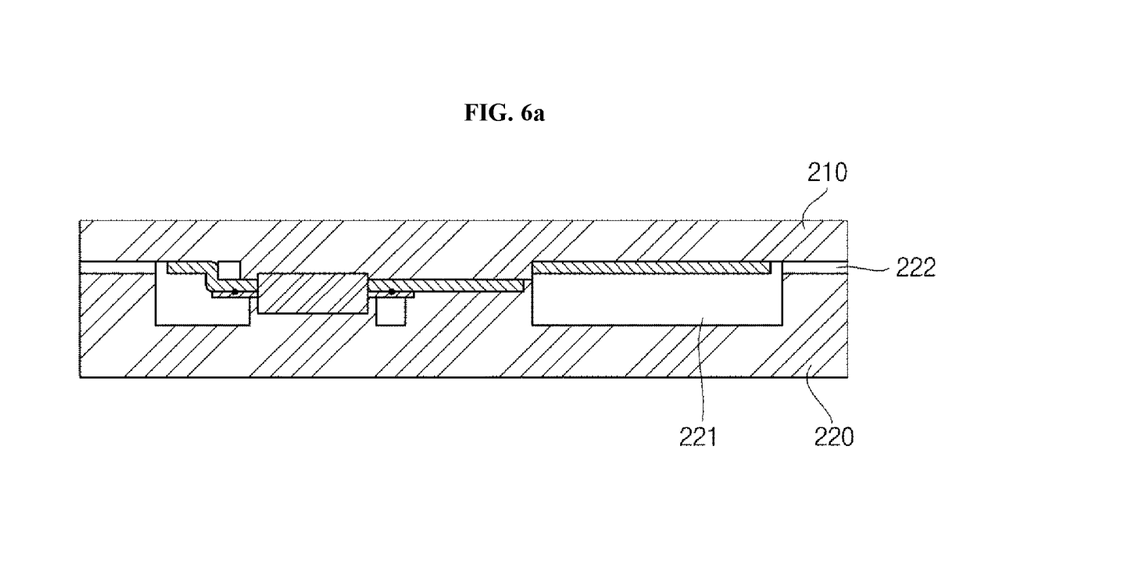
FIGS. 6a, 6b and 6c are schematic, cross-sectional views illustrating a method for manufacturing a safety member by illustrating in which an insulating holder and a conductive plate are formed by insert injection molding.
Figure 6B:
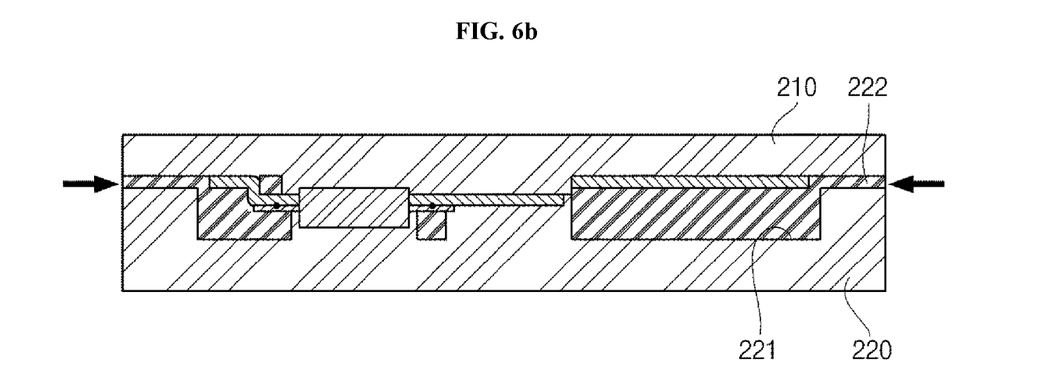
Figure 6C:
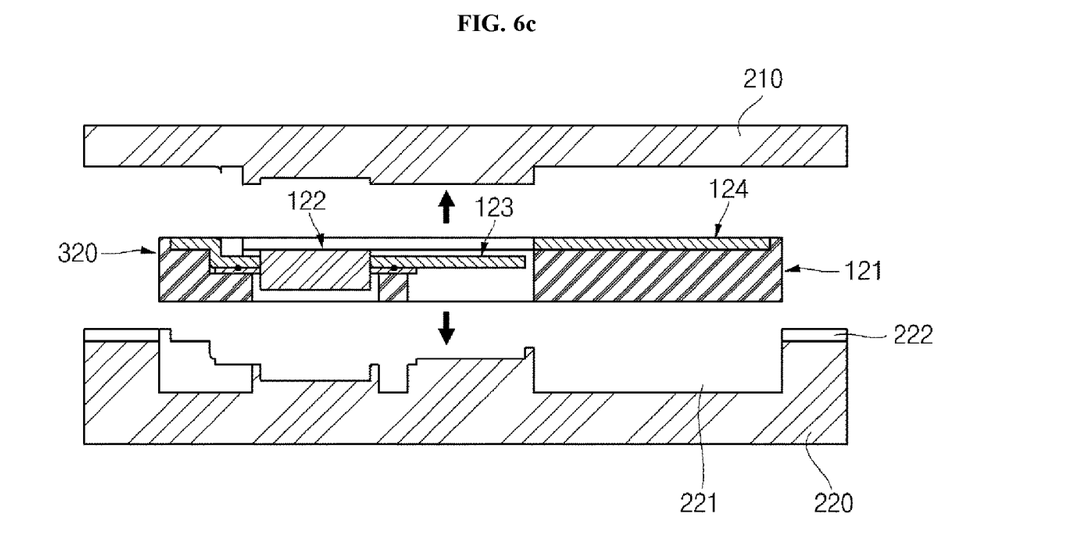

FIGS. 6a, 6b and 6c are cross-sectional views illustrating a method for manufacturing a safety member by illustrating a state in which injection molding in a method for manufacturing a battery pack according to another embodiment of the present invention.

As shown in FIG. 6a, the thermal safety device 122, the connection plate 123 and the conductive plate 124, may be positioned between an upper mold 210 and a lower mold 220. Here, a plurality of cavities 221 for forming the insulating holder 121 may be formed in the lower mold 220. In addition, gates 222 for injecting an insulating resin may be formed in the cavities 221.

As shown in FIG. 6b, a molten resin may be injected into the cavities 221 through the gates 222, and the resultant product may be allowed to stand undisturbed until the molten resin is cooled.

As shown in FIG. 6c, the upper mold 210 and the lower mold 220 may be separated from each other to attain the safety member 320 comprised of the insulating holder 121, the thermal safety device 122, the connection plate 123 and the conductive plate 124.

As described above, according to the embodiment of the present invention, a separate adhesion member for coupling the insulating holder 121 and the conductive plate 124 to each other may not be employed. That is to say, the insulating holder 121 and the conductive plate 124 may be incorporated by illustrating a state in which injection molding. Therefore, according to the present invention, the safety member 320 can be formed in a more simplified manner.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although a battery pack of the present disclosure has been described with reference to a certain embodiments thereof, it will be understood by those skilled in the art that a variety of modifications and variations may be made to the present invention without departing from the spirit or scope of the present invention defined in the appended claims, and their equivalents.

What is claimed is:

1. A battery pack, the battery pack comprising:
    a secondary battery having a case and a first planar surface with a first terminal formed on the first planar surface; and
    a safety member in electrical communication with the secondary battery, the safety member comprising:
        an insulating holder having a first surface and a second surface that defines a recess wherein the first surface of the insulating holder is positioned proximate the first planar surface of the secondary battery case;
        a thermal safety device comprising a body and first and second lead plates extending from the body, wherein the thermal safety device is mounted within the insulating holder so that the first and second lead plates are positioned within the recess of the insulating older adjacent the second surface of the insulating holder and so that the insulating holder is interposed between both the first and second lead plates of the thermal safety device and the first planar surface of the secondary battery case and so that the thermal safety device is in electrical communication with the first terminal via the first lead plate; and
        a conductive plate mounted to the insulating holder and in electrical communication with the thermal safety device via the second lead plate wherein the conductive plate is sized to fit within the recess of the insulating holder and be retained therein.

2. The battery pack of claim 1, wherein a frame of insulating holder comprises:
    a first planar portion;
    a first opening configured to receive the first terminal;
    a second planar portion;
    a second opening spaced apart from the first opening and configured to receive a body of the thermal safety device;
    wherein the first terminal is positioned within the first opening when the insulating holder is mounted to the secondary battery.

3. The battery pack of claim 2, wherein the body of the thermal safety device is positioned within the second opening and the first and second lead plates are supported by the insulating holder adjacent to the second opening when the thermal safety device is mounted within the insulating holder.

4. The battery pack of claim 2, wherein the conductive plate is mounted to the insulating holder at about the first planar portion of the insulating holder.

5. The battery pack of claim 2, wherein a thickness of the first planar portion of the insulating holder is less than that of the frame of the insulating holder.

6. The battery pack of claim 5, wherein a thickness of the second planar portion of the insulating holder is less than the thickness of the first planar portion of the insulating holder.

7. The battery pack of claim 2, wherein the insulating holder further comprises first guide members formed in at least one corner of the first planar portion of the insulating holder configured to guide the conductive plate into a selected position with respect to the insulating holder when the conductive plate is mounted to the insulating holder.

8. The battery pack of claim 7, wherein the conductive plate further comprises a coupling region, wherein the coupling region is coupled to the first guide members of the insulating holder when the conductive plate is mounted to the insulating holder.

9. The battery pack of claim 2, wherein the insulating holder further comprises second guide members formed in at least one corner of the second planar portion of the insulating holder configured to guide the conductive plate into a selected position with respect to the insulating holder when the conductive plate is mounted to the insulating holder.

10. The battery pack of claim 9, wherein the conductive plate further comprises:
a first region having an opening; and
a second region;
wherein the thermal safety device is disposed within the opening and is electrically coupled to the second region.

11. The battery pack of claim 10, wherein the opening is sized to correspond to the first opening, the second planar portion, the second opening of the insulating holder and the portion of the insulating holder positioned between the first and second openings of the insulating holder.

12. The battery pack of claim 10, wherein the second region is coupled between the second guide members of the insulating holder when the conductive plate is mounted to the insulating holder and wherein the second region is in electrical communication with the second lead plate of the thermal safety device when the conductive plate is mounted to the insulating holder.

13. The battery pack of claim 10, wherein the second region of the conductive plate further comprises a first bent portion that is downwardly bent from the first region of the conductive plate and a second bent portion extending from the first bent portion that extends substantially horizontally from the first bent portion and wherein the conductive plate is in electrical communication with the second lead plate of the thermal safety device at about the second bent portion.

14. The battery pack of claim 1, further comprising an adhesion member interposed between at least a portion of the insulating holder and the conductive plate for mechanically securing the insulating holder to the conductive plate.

15. The battery pack of claim 1, further comprising a first tape, wherein the first tape is adhered to the insulating holder and the case and further covers the opening of the conductive plate and wherein a selected portion of the conductive plate is not covered by the first tape.

16. The battery pack of claim 15, further comprising a second tape, wherein the second tape is adhered to at least a portion of the first tape, at least a portion of the safety member, and at least a first portion of the case and wherein a second portion of the case is not covered by the second tape.

17. The battery pack of claim 1, further comprising a second terminal that is positioned on a face of the battery pack opposing the first terminal.

18. The battery pack of claim 1, wherein the insulating holder and the conductive plate are formed together by insert injection molding.

* * * * *